W. S. JACKSON.
SAFETY DEVICE FOR RAILWAY CARS.
APPLICATION FILED MAR. 22, 1909.
926,334.
Patented June 29, 1909.
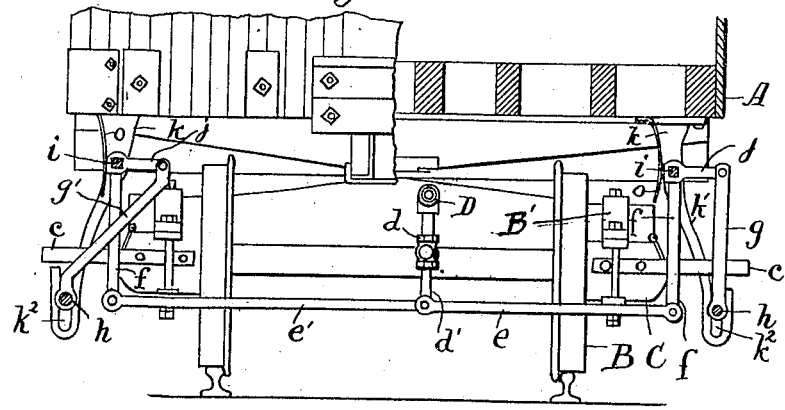
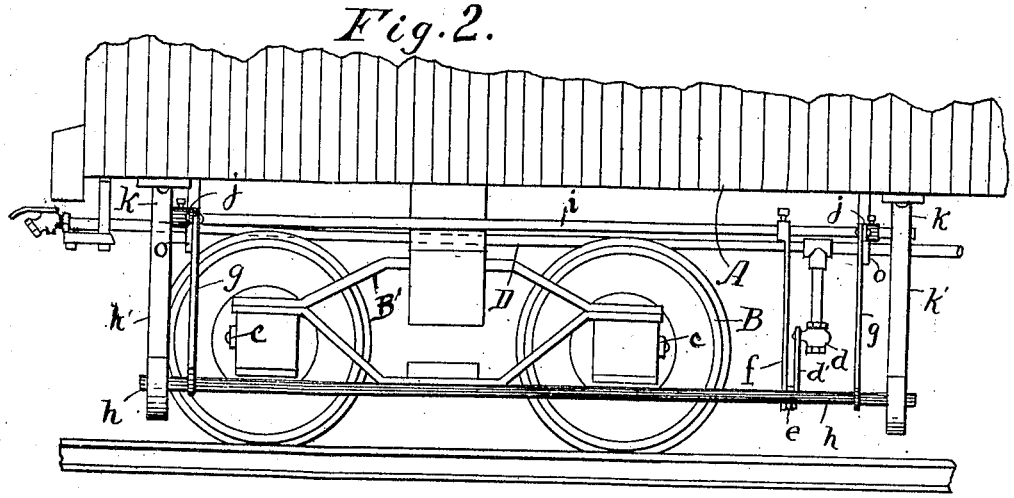
Witnesses:
Edith M. Hinckley
Eleanor W. Dennis
Inventor:
Walter S. Jackson
by S. W. Bates
Atty.

UNITED STATES PATENT OFFICE.

WALTER S. JACKSON, OF WATERVILLE, MAINE.

SAFETY DEVICE FOR RAILWAY-CARS.

No. 926,334.     Specification of Letters Patent.     Patented June 29, 1909.

Application filed March 22, 1909. Serial No. 484,869.

*To all whom it may concern:*

Be it known that I, WALTER S. JACKSON, of Waterville, in the county of Kennebec, in the State of Maine, have invented certain new and useful Improvements in Safety Devices for Railway-Cars, of which the following is a specification.

My invention relates to safety devices for railway cars of that class designed to open a relief valve in the train pipe when any one of the wheels goes off the rail whereby the air brakes are automatically applied and the train stopped.

The object of my present invention is to construct a device of this character which may be applied to both freight and passenger cars, which will permit the truck to turn freely with relation to the car body and which will be operated when any one wheel leaves the rail.

I carry out the above object by means of the device hereinafter described and claimed.

I illustrate my invention by means of the accompanying drawing in which—

Figure 1 shows a part elevation of an end of a car with part transverse section of the same and having my safety device applied, and Fig. 2 is a side elevation of the same, showing one pair of trucks.

In the drawings, similar letters represent similar parts.

A represents the car body, B the wheels and B' the truck frame, D being the train pipe connected with the air brake system.

According to my invention I provide a relief valve as $d$ connected with the train pipe preferably by means of a right angle offset as here shown. The relief valve is provided with a suitable operating handle $d'$ or other equivalent means of opening the valve. Mechanism is provided by which this valve is opened automatically when any portion of the car truck drops down below its normal position with relation to the car body as when the truck leaves the rail.

The mechanism is operated primarily by a series of horizontally disposed arms $c$ one of which is secured to the truck frame adjacent to each of the axles. I have here shown the arm $c$ as attached to the side of each journal box but it may be secured to the truck frame in any other suitable position except that it should in each case be near the axle of the wheel so that when the wheel leaves the track it follows the latter downward with relation to the car body.

The impulse by which the mechanism is operated is given by the impingement of the arm $c$ upon a horizontally disposed member running lengthwise of the car vertically beneath the arm $c$ and in such a position as to be struck by it when the wheel drops down from the rail or otherwise falls down with relation to the car body.

As here shown, considering the mechanism shown on the right hand side of Fig. 1, this horizontal member consists of a rod $h$ suspended from the lower ends of the two links $g$, these links being in turn connected with the outer ends of two horizontal arms $j$ secured to a shaft $i$ journaled in hangers $k$ secured as here shown on the under side of the car body. The arm $c$ extends horizontally out over the rod $h$ and sufficiently high above it to allow for any vertical motion which the car may make with reference to the truck whereby the arm $c$ will never come in contact with the rod $h$ unless the wheel or truck drops down from the rail and below its normal position. Means are provided for holding and guiding the ends of the rod $h$ and as here shown I extend downward the hangers which support the shaft $i$ forming downward extension $k'$ turned up at the lower ends to form a vertical slot $k^2$ in which the rod $h$ is free to play vertically. Means are provided for holding the shaft $i$ in its normal position so that the arm $j$ will be in a horizontal position and as here shown, I accomplish this by means of a spring $o$ secured to the car body and pressing against a square face formed on the inner end of the arm $j$. Connecting mechanism is provided connecting the valve handle $d'$ with the shaft $i$ whereby the valve is opened by the rotation of the shaft $i$. For this purpose I secure to the shaft $i$ at a point where it is free from the truck a depending arm $f$ to the lower end of this arm is connected a link $e$ one end of which is connected to the lower end of the arm $f$ and the other end to the valve handle $d^2$.

The rod h and the shaft i extend along opposite the end of the truck to a point where the arm f and the mechanism connecting with the relief valve will be clear of the truck and space enough is allowed between the arm c and the other portions of the mechanism to allow the trucks to turn freely in either direction as it passes around curves in the railroad.

The parts so far described are shown on the right hand side of Fig. 1 and corresponding parts are shown on the opposite side of the car at the left hand of Fig. 1 with the exception that the short arm j instead of projecting outward projects inward underneath the car and it is connected with the horizontal rod h by a bent link g' so that the act of depressing the rod h will rotate the shaft i on that side of the car in the same direction as the opposite shaft is rotated.

As here shown the lower end of the link f on the left hand side of Fig. 1 is connected with the valve handle d' by the horizontal link e' and as a result of this construction the rotation of either shaft i pushes the valve handle in the same direction and causes the valve to open. This same result may be accomplished by connecting the rod h to the arm j otherwise than as here shown.

Having described the construction of my device, its operation is easily understood. When one of the wheels leaves the track the arm c strikes the rod h and forcing it downward causes the link g to turn the shaft i. The arm f will thus be swung in the proper direction to open the valve acting through the link e on one side and the link e' on the outer side. When the relief valve is open the brakes are automatically set as in the ordinary operation of the air brake.

In practice one of the actuating arms c is secured to the truck or some portion thereof near each wheel and on both ends of the car so that if an axle breaks or a wheel breaks or one of the wheels is derailed or anything happens which will cause the truck or any portion thereof to drop below its normal position with regard to the car body the air brake is at once set.

The device as I have shown and described it is adapted to be applied to either passenger or freight cars and it is so designed that it will not interfere in any way with the ordinary running of the train or the free movement of the truck about its pivoting pin.

While I have described in detail the one manner of applying the invention, it is obvious that modifications may be made in the mechanism without departing from the spirit of the invention, and numerous modifications may be made to adapt the device to cars of various builds.

The mechanism connecting the rod h with the relief valve may be varied from what is here shown so long as a downward motion of the rod acts to open the valve through suitable connecting mechanism.

I claim:—

1. In a safety device for railway cars, the combination of a horizontally projecting arm secured to the truck, a horizontal bar extending lengthwise of the car and vertically beneath said arm, a plurality of links for supporting said bar, a shaft journaled beneath and supported by the car body and substantially parallel with said rod, horizontal arms on said shaft to the ends of which said links are connected, a relief valve on the train pipe and mechanism for opening said relief valve operated by the rotation of said shaft.

2. In a safety device for railway cars, the combination of a horizontally projecting arm secured to the truck, a horizontal bar extending lengthwise of the car and vertically beneath said arm, yielding supports for said bar attached to the car body, a relief valve on the train pipe and mechanism for opening said relief valve operated by the depression of said bar.

3. In a safety device for railway cars the combination of a horizontal arm secured to the truck, a horizontal bar extending longitudinally of the car and beneath said arm, a plurality of links for supporting said bar, a shaft journaled beneath and supported by the car body and substantially parallel with the rod, horizontal arms on said shaft to the ends of which said links are connected, a relief valve on the train pipe, a depending arm on said shaft and a link connecting said depending arm with the relief valve to open the same.

4. In a safety device for railway cars, the combination of a horizontally projecting arm secured to the truck, a horizontal bar extending lengthwise of the car and vertically beneath said arm, a plurality of links for supporting said bar, a shaft journaled beneath and supported by the car body and substantially parallel with said rod, horizontal arms on said shaft to the ends of which said links are connected, a relief valve on the train pipe and mechanism for frictionally retaining the shaft in its normal position and mechanism for opening said relief valve operated by the rotation of the shaft.

5. In a safety device for railway cars, the combination of a horizontally projecting arm secured to the truck, a horizontal bar extending lengthwise of the car and vertically beneath the said arm, a plurality of links for supporting said bar, a shaft beneath the car body and substantially parallel with said bar, hangers in which said shaft is journaled secured to the under side of the car body each of said hangers having a downward extension containing a vertical slot for embracing and guiding said rod, horizontal arm on said shaft to the ends of which the said links are connected, a relief valve on the train pipe and mechanism operated by the rotation of said shaft for opening said relief valve.

6. In a safety device for railway cars the combination of a horizontally projecting arm secured to the truck, a horizontal member vertically beneath said arm extending lengthwise of the car and secured to the car body, a relief valve for the train pipe and mechanism for opening said relief valve operated by the depression of said horizontal member.

In witness whereof I have hereunto set my hand this 13th day of March, 1909.

WALTER S. JACKSON.

Witnesses:
S. W. BATES,
E. W. DENNIS.